(12) United States Patent
Inugai

(10) Patent No.: US 7,410,112 B2
(45) Date of Patent: Aug. 12, 2008

(54) SINGLE-REEL TYPE TAPE CARTRIDGE, AND TAPE DRIVE

(75) Inventor: Yasuo Inugai, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 0 days.

(21) Appl. No.: 11/902,085

(22) Filed: Sep. 18, 2007

(65) Prior Publication Data

US 2008/0067272 A1    Mar. 20, 2008

(30) Foreign Application Priority Data

Sep. 19, 2006    (JP) ............................. 2006-252168

(51) Int. Cl.
*G11B 23/07*    (2006.01)
(52) U.S. Cl. .................... 242/338.1; 242/348
(58) Field of Classification Search ................ 242/338, 242/338.1, 348, 348.2, 343, 343.2; 360/132
See application file for complete search history.

(56) References Cited

U.S. PATENT DOCUMENTS

| | | | | |
|---|---|---|---|---|
| 5,436,782 | A * | 7/1995 | Sieben | ........................ 360/132 |
| 6,270,030 | B1 * | 8/2001 | Johnson et al. | ............. 242/338 |
| 7,175,123 | B2 * | 2/2007 | Hiraguchi | ................ 242/338.1 |
| 7,237,740 | B2 * | 7/2007 | Hiraguchi | ................ 242/338.1 |
| 7,322,540 | B2 * | 1/2008 | Hiraguchi | ................ 242/338.1 |
| 7,350,731 | B2 * | 4/2008 | Hiraguchi | ................ 242/338.1 |
| 2005/0023400 | A1 * | 2/2005 | Hiraguchi | ................... 242/348 |
| 2005/0184181 | A1 | 8/2005 | Hiraguchi | |
| 2007/0295849 | A1 * | 12/2007 | Sogabe | .................... 242/338.1 |

FOREIGN PATENT DOCUMENTS

| | | |
|---|---|---|
| JP | 2004-46993 A | 2/2004 |
| JP | 2005-276413 A | 10/2005 |

* cited by examiner

*Primary Examiner*—William A Rivera
(74) *Attorney, Agent, or Firm*—Birch, Stewart, Kolasch & Birch, LLP

(57) ABSTRACT

In a single-reel type tape cartridge, a floating-lock structure comprising lock pieces and a lock spring for locking and biasing the lock pieces is provided between an upper surface of a tape reel and an upper case. On each of the lock piece are provided a restriction member for restricting upward movement of the tape reel and a releaser that is subjected to an unlocking operation performed an unlock member in a tape drive. Entry grooves for the unlock members are formed on an outer surface of the upper case, and the releasers are exposed in the entry grooves from operation openings provided in part of the entry grooves. When a main body case is loaded in the tape drive, the releasers are subjected to the unlocking operation by the unlock members so that the restriction members can move and evacuate upward in a hub space surrounded by a reel hub.

8 Claims, 8 Drawing Sheets

SINGLE-REEL TYPE TAPE CARTRIDGE, AND TAPE DRIVE

BACKGROUND OF THE INVENTION

1. Field of the Invention

The present invention relates to a single-reel type tape cartridge having a floating-lock structure for restricting upward movement of a tape reel in nonuse status and relates to a tape drive therefor.

2. Description of the Related Art

A rotation lock structure for restricting rotation of a tape reel in nonuse status is publicly known as Japanese unexamined patent application publication No. 2004-46993 (Patent Document 1, e.g., paragraph No. 0014, FIG. 1), for instance. The rotation lock structure is composed of a locking member that is guided and supported by an upper casing so as to be movable only in vertical directions, a spring for pressing down and biasing the locking member, gear teeth provided on the locking member, gear teeth formed on inner bottom of a reel hub and corresponding to the gear teeth on the locking member, and the like. In the nonuse status, the tape reel is held, so as to be incapable of rotating, by engagement between the locking member and the inner bottom wall of the reel hub through the gear teeth on both sides. In use, the locking member can be held in an unlocked posture by upward press against the locking member by an unlock pin provided on a drive shaft of the tape drive.

In such a rotation lock structure of this type, the tape reel in nonuse status can be held so as to be incapable of rotating but cannot be restricted in upward movement thereof. Upon reception of a large external force such as drop impact, accordingly, an upper flange of the tape reel may collide with an inner wall of a main body case, thereby may deform and damage edges of a recording tape. There is a trend for thicknesses of recording tapes to decrease with advancement in recording capacity of tape cartridges, and low physical strengths of recording tapes make a cause of susceptibility of tape edges to damage.

Other than such a rotation lock structure as described above, a tape cartridge having a floating-lock structure for restricting upward movement of a tape reel is publicly known as Japanese unexamined patent application publication No. 2005-276413 (Patent Document 2, e.g., paragraph No. 0055, FIG. 2), for instance. On an inner surface of an upper wall of a main body case are provided three lock pieces that reciprocate and slide in radial directions, and upward movement of the tape reel is restricted by insert engagement of outer ends of the lock pieces between an opening edge of a reel hub and the upper wall of the case. The lock pieces are locked and biased by springs, and upward thrust at a locking member described above with an unlock pin on the tape drive unlocks the lock pieces against biasing forces of the springs. For that operation, a cam piece is integrally provided on a lower surface at inner end of the lock piece, and a release projection for unlocking the lock piece through the cam piece is provided on upper surface side of the locking member.

SUMMARY OF THE INVENTION

In the tape cartridge of Patent Document 2, the tape reel in nonuse status can be locked and held so as to be incapable of moving upward. The floating-lock structure, however, is composed of the three lock pieces, the lock springs, the cam pieces for unlocking, the release projections, a guide structure provided on an inner surface of an upper wall of the main body case, and the like and is inevitably complicated, so that a production cost for the tape cartridge becomes so much the larger. There is also a disadvantage in that a structure of the upper case is complicated. Besides, an entry opening for the unlock pin has to be provided on a bottom wall of the reel hub and, when the reel hub including the upper flange is molded, molten resin cannot be fluidized uniformly.

When the tape reel is driven and rotated by the drive shaft of the tape drive, the locking member needs to be pressed upward by the unlock pin and to be held in the unlocked status against elasticity of the spring locking and biasing the locking member and elasticity of the springs locking and biasing the lock pieces. In the unlocked status, therefore, a large frictional resistance is inevitably produced between the lower surface of the locking member and the unlock pin, and so much the larger power loss is inevitably caused in the tape drive. There is also a disadvantage in that a structure of the drive shaft is complicated.

It is a first object of the invention to provide a single-reel type tape cartridge which is capable of reliably restricting upward movement of a tape reel with use of a simpler structure and of which production cost can be all the lower because the structure is simplified in comparison with conventional floating-lock structures.

It is a second object of the invention to provide a single-reel type tape cartridge having a floating-lock structure which can be unlocked only upon loading of the tape cartridge in a tape drive and thus cannot be unlocked in nonuse status and by which a tape reel in the nonuse status can be locked and held reliably at all times.

It is a third object of the invention to provide a tape drive which is capable of reliably preventing activation of equipment in the tape drive while a main body case is loaded in an inappropriate posture in the tape drive and of which reliability thus can be improved with elimination of malfunction, failure and the like of the equipment in the tape drive.

In order to achieve the objects, the invention is configured as follows.

According to a first aspect of the present invention, there is provided a single-reel type tape cartridge comprising:
 a main body case including an upper case and a lower case;
 a tape reel which is housed in the main body case and on which a recording tape is wound; and
 a floating-lock structure, which is provided between an upper surface of the tape reel and the upper case, for restricting upward movement of the tape reel in nonuse status, wherein
 an outer surface of the upper case has an entry groove which has a recessed section and which is to be engaged with an unlock member provided in a tape drive so as to guide relative entry of the unlock member, and
 a loading posture of the main body case relative to the tape drive is restricted by engagement between the unlock member and the entry groove and by guidance of the relative entry thereof in a process in which the main body case is loaded into the tape drive, and the floating-lock structure is unlocked by action of the unlock member on the floating-lock structure with the unlock member being engaged with the entry groove.

According to a second aspect of the present invention, there is provided a single-reel type tape cartridge as defined in the first aspect, wherein
 the floating-lock structure comprises:
  a lock piece which is placed on an inner surface of the upper case and which is supported by the upper case so as to be capable of reciprocating between a locked posture and an unlocked posture; and
  a lock spring for moving and biasing the lock piece toward the locked posture, and wherein the lock piece comprises:

a restriction member which, in the locked posture, restricts upward movement of the tape reel by being brought into contact with the tape reel and which, in the unlocked posture, releases the contact with the tape reel and releases the restriction; and a releaser that moves the lock piece from the locked posture to the unlocked posture against a biasing force of the lock spring by being pressed by the unlock member of the tape drive, and wherein an opening penetrating the upper case is formed in part of the entry groove so as to expose the releaser in the entry groove, and part of the releaser exposed in the entry groove is pressed by the unlock member so that the lock piece is shifted to the unlocked posture, in a state in which the main body case has been loaded in the tape drive.

According to a third aspect of the present invention, there is provided a single-reel type tape cartridge as defined in the second aspect, wherein a pair of the floating-lock structures are placed between the upper surface of the tape reel and the upper case, the entry grooves for the unlock members are placed symmetrically on the outer surface of the upper case so as to correspond to the pair of the floating-lock structures, and the releasers of the floating-lock structures are respectively exposed in the entry grooves from the openings provided in the entry grooves in a state in which the main body case is not loaded in the tape drive.

According to a fourth aspect of the present invention, there is provided a single-reel type tape cartridge as defined in the second aspect, wherein the lock piece comprises:

a swing arm which is pivoted through a spindle on the upper case so as to be capable of performing reciprocating swinging and on which releaser is fixed to an upper surface thereof and the restriction member is fixed to a lower surface thereof; and a swing protrusion which is fixed to swingable distal end side on the upper surface of the swing arm and which guides the reciprocating swinging of the swing arm by being moved and guided along a guide groove formed on the upper case, and wherein the lock piece is reciprocated between the locked posture and the unlocked posture by the reciprocating swinging of the swing arm.

According to a fifth aspect of the present invention, there is provided a single-reel type tape cartridge as defined in the third aspect, wherein a pair of the lock pieces in the pair of the floating-lock structures are moved and biased toward the locked posture by one torsion coil spring placed as the lock spring on the inner surface of the upper case.

According to a sixth aspect of the present invention, there is provided a single-reel type tape cartridge as defined in the second aspect, wherein a clearance for preventing contact between a peripheral edge of a lower flange of the tape reel and an inner surface of the lower case which might be caused by a tilt of the tape reel in the main body case is provided between the peripheral edge of the lower flange and the inner surface of the lower case in a state in which upward movement of the tape reel is restricted by the floating-lock structure.

According to a seventh aspect of the present invention, there is provided a tape drive for a single-reel type tape cartridge in which a tape reel, for winding with a recording tape, is housed in a main body case including an upper case and a lower case, the tape drive comprising:

an unlock member provided in loading part of the tape drive, for performing an unlocking operation by engaging with an entry groove formed on an outer surface of the upper case and by acting on a floating-lock structure provided between an upper surface of the tape reel and the upper case in the tape cartridge, the floating-lock structure having a function of restricting upward movement of the tape reel in nonuse status;

a sensor for detecting whether a loading posture of the tape cartridge relative to the loading part is proper or not and detecting that the floating-lock structure has properly been unlocked; and a control circuit for controlling operation of equipment in the tape drive in accordance with an output signal from the sensor.

According to an eighth aspect of the present invention, there is provided a tape drive as defined in the seventh aspect, wherein the sensor is a sensor for detecting an external force acting on the unlock member, and the control circuit determines that whether a loading posture of the tape cartridge is proper or not and that the floating-lock structure has properly been unlocked, by comparing a detection signal outputted from the sensor with a predetermined reference signal.

In the tape cartridge of the invention, the floating-lock structure is provided between the tape reel and the upper case, and upward movement of the tape reel in nonuse status can be restricted by the floating-lock structure. The entry grooves that are to be engaged with and guided by the unlock members provided in the tape drive are formed as recesses on the outer surface of the main body case, and the floating-lock structure can be unlocked with use of the engagement between the unlock members and the entry grooves in a process in which the main body case is loaded into the tape drive. Concurrently, loading of the main body case in a wrong loading posture can be prevented by the unlock members and the entry grooves.

In the tape cartridge having the floating-lock structure, as described above, upward movement of the tape reel in nonuse status that may be caused by drop impact or the like can be prevented by the floating-lock structure. Upon reception of a large external force such as drop impact in the tape cartridge of the invention, accordingly, deformation of the upper flange of the tape reel resulting from collision with the inner wall of the main body case can be excluded by the restriction of the upward movement of the tape reel and thus damage to tape edges of the recording tape can reliably be prevented.

In the floating-lock structure composed of the lock pieces, the lock spring for moving and biasing the lock pieces, and the like, upward movement of the tape reel in nonuse status can be restricted by the restriction members. The releasers provided on the lock pieces are unlocked by the unlock members, so that the restriction can be released by evacuating movement of the restriction members to upper part of the hub space in the tape reel and so that the tape reel is allowed to move upward.

In the floating-lock structure configured as described above, the number of members forming the floating-lock structure can significantly be reduced while upward movement of the tape reel is reliably restricted, in comparison with conventional lock structures of this type. The production cost for the tape cartridge can be made all the lower because the structure can be simplified. There is also an advantage in that incidences of failure, defective assemblage and the like can be made the lower and thus reliability of the floating-lock structure can be made the higher for the simplicity of the floating-lock structure.

Furthermore, the lock pieces of the floating-lock structure are unlocked only upon loading of the tape cartridge in the tape drive, and thus unlocking of the lock pieces in nonuse status can more reliably be prevented in is comparison with conventional lock structures of this type, so that the tape reel in nonuse status can be locked and held reliably at all times and so that the tape edges of the recording tape can be protected.

In the tape cartridge in which the pair of floating-lock structures are provided inside the main body case and in which upward movement of the tape reel is restricted by the pair of the lock pieces, movement at two sites on the upper surface of the tape reel is restricted by the restriction members and thus upward movement of the tape reel can be restricted more reliably. The pair of restriction members are capable of preventing a great tilt of the tape reel by restricting tilt of the tape reel in the main body case upon reception of drop impact or the like, and thus damage or the like to the tape edges of the recording tape can more reliably be prevented.

In the floating-lock structure in which the lock piece is composed of the swing arm, the releaser, the restriction member, the swing protrusion provided on the swingable distal end side on the swing arm, and the like, in which the swing arm is pivoted on the spindle, and in which the movement of the swing protrusion is guided by the guide groove formed on the upper case, shift of swing track of the lock piece can be restricted by cooperation among the swing protrusion, the guide groove, and the spindle, so that swing reciprocation of the lock piece can be made smoother and so that reliability of the operation can be improved.

In the floating-lock structure in which the pair of lock pieces are moved and biased toward the locked posture by the one lock spring provided on the inner surface of the lower case, the lock pieces can be locked and biased with uniform spring forces in comparison with a configuration in which each of a pair of lock pieces is locked and biased by an exclusive lock spring. Besides, the production cost for the tape cartridge can be made all the lower because the number of component members in the floating-lock structure is reduced.

In the status in which the upper surface of the tape reel having received drop impact or the like and having tilted in the main body case is stopped and received by the restriction member, contact of the lower flange with the lower case can reliably be prevented by the clearance ensured between the peripheral edge of the lower flange on tilted lower end side and the lower case. As a result, deformation or damage of the lower tape edges of the recording tape that might be caused by the lower flange can reliably be prevented, and the recording tape can more reliably be protected in conjunction with the protection of the upper tape edges of the recording tape that is effected by the floating-lock structure.

In the tape drive according to the invention, the sensor is provided for detecting whether the loading posture of the tape cartridge is proper or not and detecting that the floating-lock structure has properly been unlocked, and the operation of the equipment in the tape drive can be controlled by the control circuit in accordance with an output signal from the sensor. In the tape drive of the invention, accordingly, the equipment in the tape drive can reliably be prevented from being activated while the main body case has been loaded in an inappropriate posture in the loading part or while the floating-lock structure has not fully been unlocked. Consequently, malfunction or failure of the equipment in the tape drive can be excluded and reliability of the tape drive can be improved.

In the tape drive in which external forces acting on the unlock members are detected by the sensor and in which detection signals outputted from the sensor are processed by the control circuit, whether the loading posture of the tape cartridge is proper or not can be determined with a simpler sensor structure. Specifically, useless complication of the structure of the tape drive can be prevented by the control circuit which can determine that the loading posture of the tape cartridge is improper, that the floating-lock structure has not fully been unlocked, or the like on basis of a detection signal from the sensor. This configuration is useful for preventing increase in the production cost for the tape drive.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
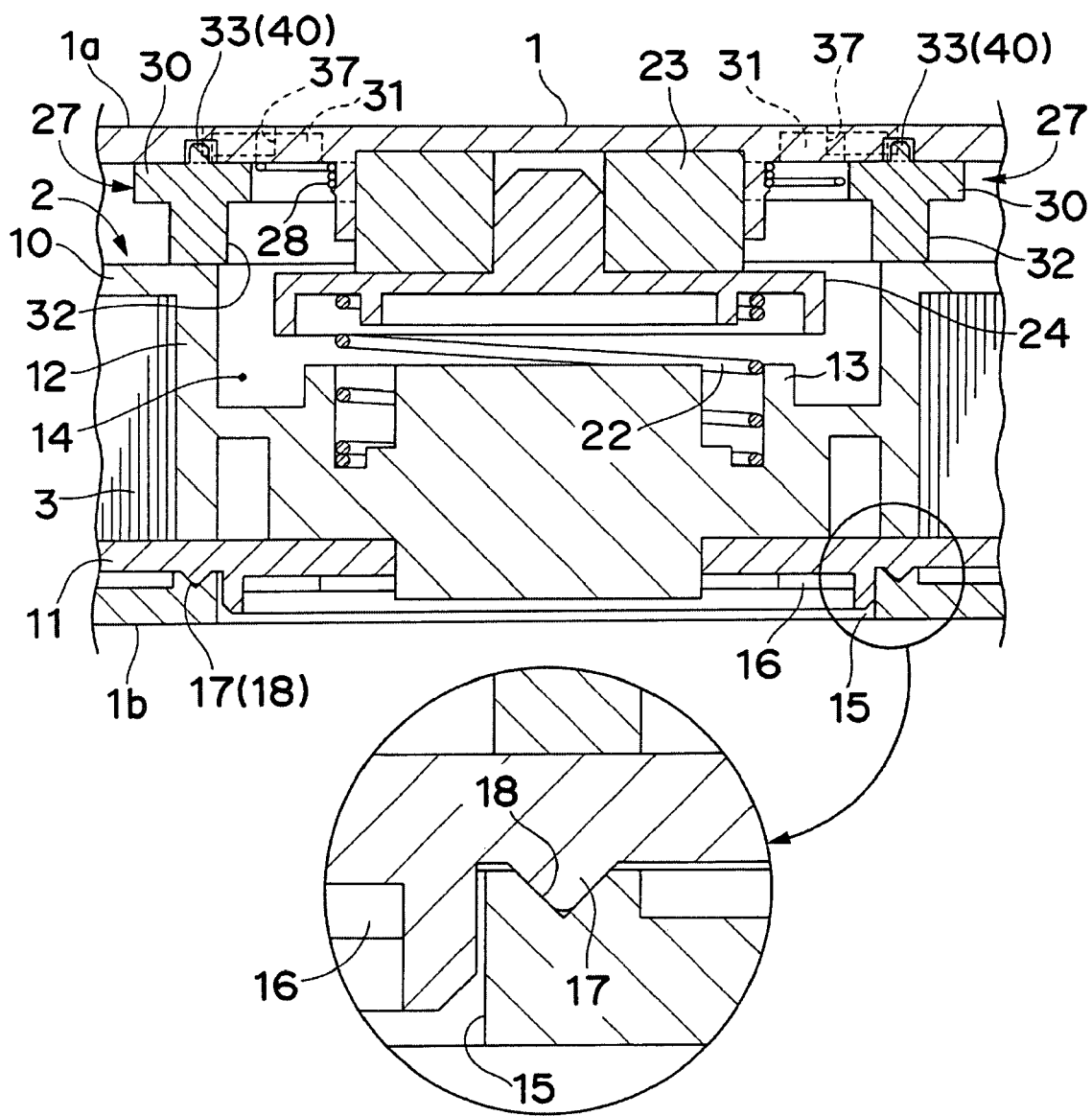
FIG. 1 is a section of a tape cartridge along line A-A in FIG. 2.

Before the description of the present invention proceeds, it is to be noted that like parts are designated by like reference numerals throughout the accompanying drawings.

Hereinbelow, embodiments of the invention will be described in detail with reference to the drawings.

Embodiments

FIGS. 1 through 9 show an embodiment of a single-reel type tape cartridge according to the invention. In the tape cartridge in FIGS. 1 and 2, a tape reel 2 is housed in a main body case 1 shaped like a rectangular box, and a recording tape 3 (magnetic tape) as information recording medium is wound on and housed in the tape reel 2. To a feeding end of the recording tape 3 is fixed a leader block 4.

Figure 2:
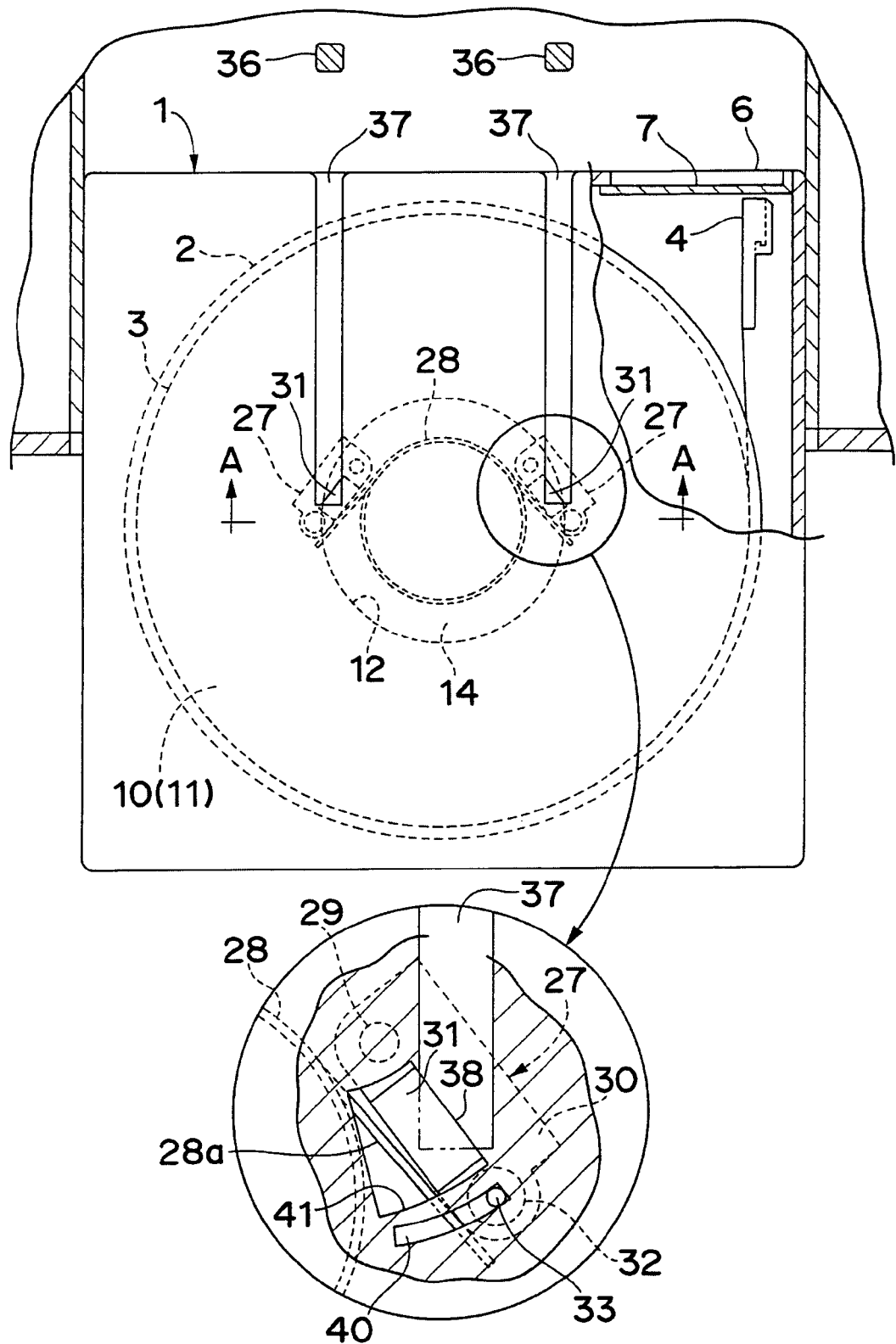
FIG. 2 is a partly broken plan view of the tape cartridge according to an embodiment of the invention.

As shown in FIG. 1, the main body case 1 is composed of an upper case 1a and a lower case 1b that are joined and fixed so as to fit with each other, and a loading aperture 6 through which the recording tape 3 is extracted and returned is provided on one side on a front wall thereof (see FIG. 2). The loading aperture 6 can be shut and opened by a slidable shutter 7. When the tape cartridge is in nonuse status, the leader block 4 is held and fixed in a predetermined standby position by a holding structure provided in the main body case 1 so that a front end of the block confronts the loading aperture 6. Upon loading of the main body case 1 in the tape drive, the shutter 7 is opened, the leader block 4 is engaged with and connected to a catch member of the tape drive, and the recording tape 3 is drawn out of the case.

Figure 3:
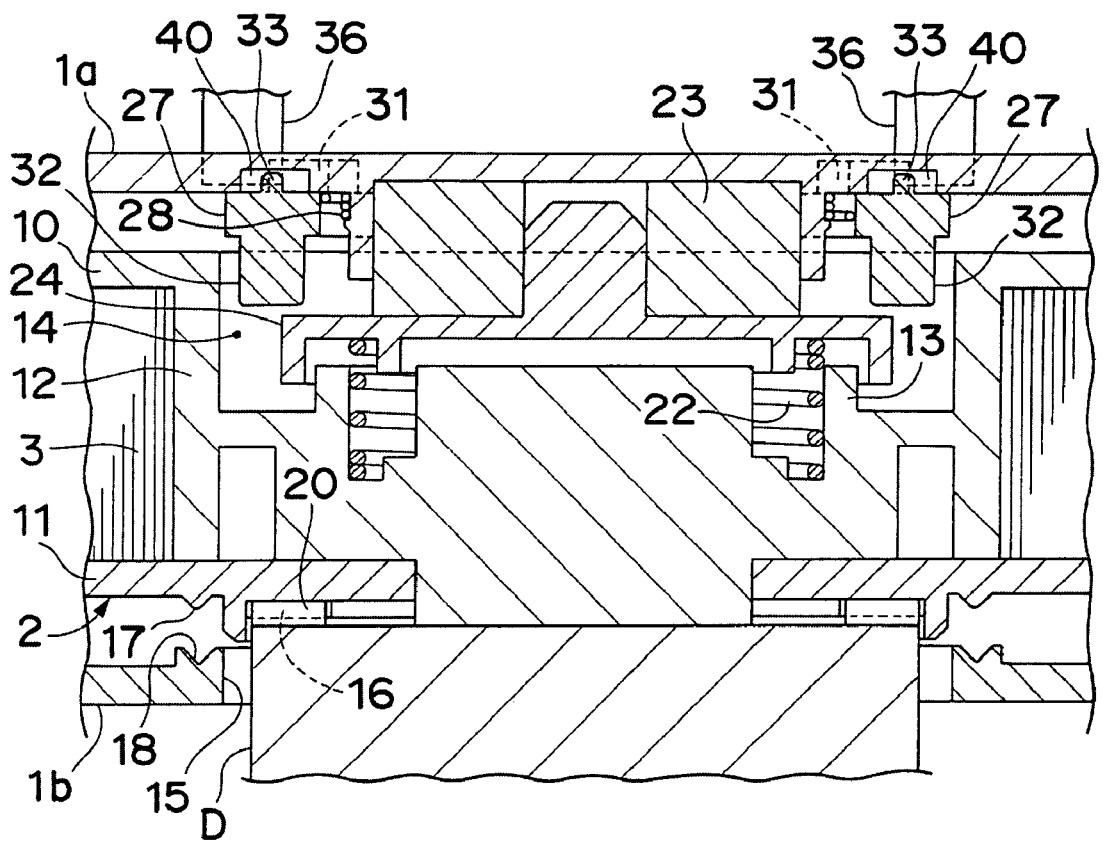
FIG. 3 is a section of the tape cartridge in which a floating-lock structure has been unlocked.

As shown in FIGS. 1 and 3, the tape reel 2 comprises a pair of upper and lower disc-like flanges 10, 11, and a reel hub 12 on which the recording tape 3 is wound. The upper flange 10 is integrally molded with the reel hub 12, and the lower flange 11 is welded and fixed to the reel hub 12 by ultrasonic welding. The reel hub 12 is formed of a cylindrical wall having a circular section and has a spring receiver boss 13 at a center of inside thereof. A hub space 14 that opens upward is defined by the reel hub 12 and the spring receiver boss 13.

As shown in FIG. 1, a ring-like circumferential wall that fits in a drive shaft entry hole 15 on the lower case 1b protrudes downward at a center on the lower surface of the lower flange 11, and gear teeth 16 are circumferentially formed along proximal end of an inner surface thereof. A positioning rib 17 having a triangular section circumferentially protrudes at a center on the lower surface of the lower flange 11 so as to adjoin a circumferential surface of the circumferential wall. The lower surface of the lower flange 11 is supported by a ring-like boss wall swelling on an opening of an inner surface of the drive shaft entry hole 15, and the positioning rib 17 is engaged with and supported by a circumferential positioning groove 18 formed as a recess in the boss wall, so that a whole body of the tape reel 2 can be supported while being properly positioned with respect to the drive shaft entry hole 15. An adequate clearance (e.g., 1 mm) is ensured between the lower flange 11 and an inner bottom surface of the lower case 1b in this state. Ensuring the clearance prevents contact between a peripheral edge of the lower flange 11 and the inner surface of the lower case 1b even if the tape reel 2 is tilted in the main body case 1, as will be described later.

In order to mainly restrict floating rotation of the tape reel 2 in nonuse status, a reel spring 22 is provided between the upper case 1a and the spring receiver boss 13. Specifically, a bearing member 23 is mounted on an inner surface of the upper case 1a, and the reel spring 22 of compression coil type is provided between a spring bearing flange 24 supported rotatably on the bearing member 23 and the spring bearing boss 13. The reel spring 22 presses down and biases the tape reel 2 and thereby effects closely contact engagement between the positioning rib 17 and the positioning groove 18, so that a frictional resistance between both the elements 17 and 18 prevents the tape reel 2 from rotating and floating in radial directions.

The invention is characterized in that such a single-reel type tape cartridge as described above is provided with the floating-lock structure preventing upward movement of the tape reel 2 in nonuse status. In this example, as shown in FIG. 2, a pair of left and right floating-lock structures are provided on the inner surface of the upper case 1a, so that upward movement of the tape reel 2 can more reliably be prevented.

Figure 4:
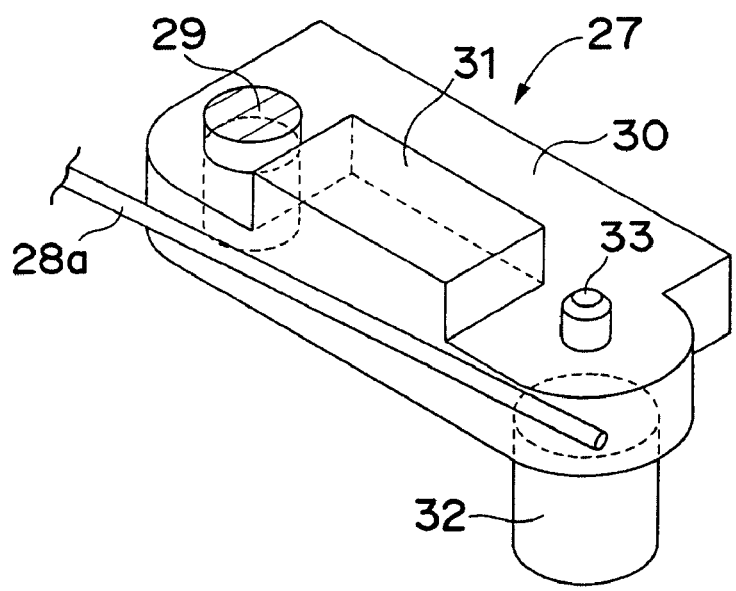
FIG. 4 is a perspective view of a lock piece that the floating-lock structure has.
Figure 5:
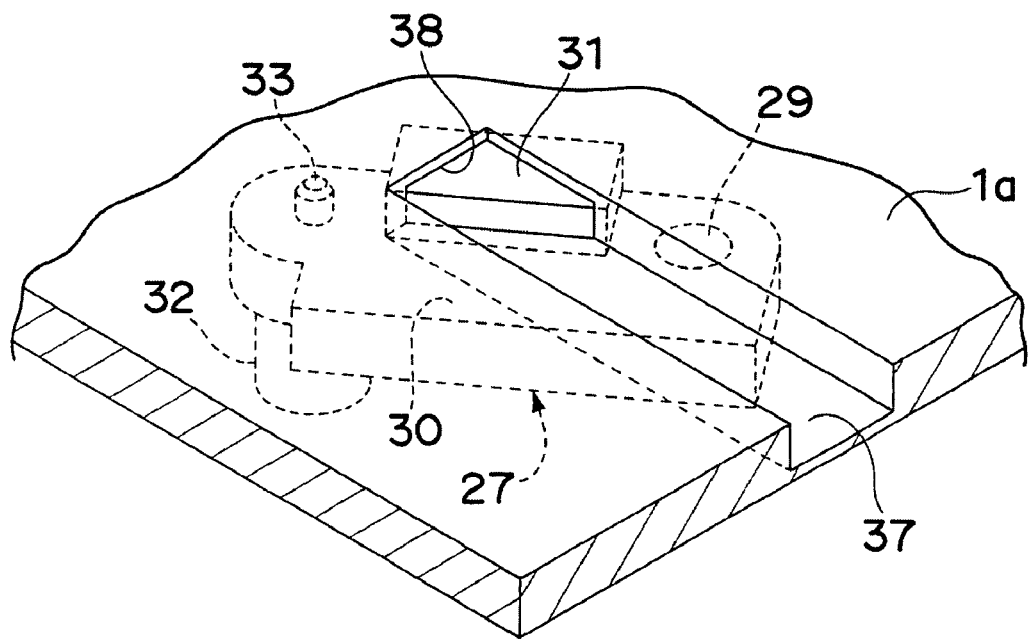
FIG. 5 is a perspective view showing of a structural relation between the lock piece and an entry groove for unlocking.
Figure 6:
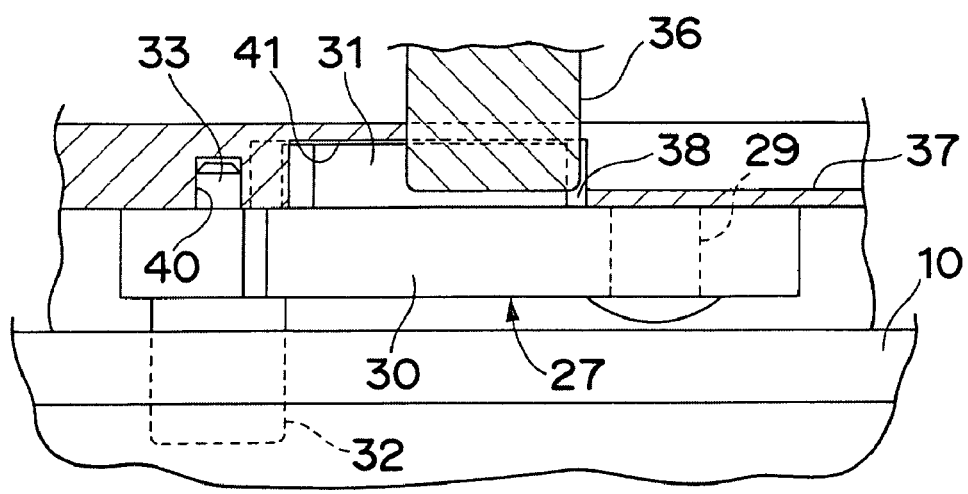
FIG. 6 is a section taken along line B-B in FIG. 8.

The floating-lock structure comprises a lock piece 27 mounted on the inner surface of the upper case 1a and a lock spring 28 for swinging and biasing the lock piece 27 toward a locked posture, and the lock piece 27 can be unlocked by an unlocking structure that will be described later. As shown in FIG. 4, the lock piece 27 is formed as a plastic molding integrally having a plate-like swing arm 30 that is pivoted on a spindle 29 provided on the upper case 1a so as to be capable of returnably swinging, a releaser 31 protruding on one side on an upper surface of the swing arm 30, a restriction member 32 shaped like a cylindrical shaft and provided on a lower surface on swingable distal end side of the swing arm 30, and a swing protrusion 33 provided on the swingable distal end side on the upper surface of the swing arm 30. A torsion coil type spring is used as the lock spring 28, and each of spring arms extending on both sides thereof is in contact with one side of the lock piece 27.

With one end of the swing arm 30 pivoted on the spindle 29 provided integrally on the upper case 1a, the lock piece 27 is capable of swinging and reciprocating between the locked posture (status shown in FIGS. 5 and 7) in which the releaser 31 is exposed in a rear end of an entry groove 37 that will be described later and an unlocked posture (status shown in FIG. 8) in which the releaser 31 has been pushed out of the entry groove 37. In the locked posture, the restriction member 32 faces an upper end surface of the reel hub 12 with a slight clearance between, and prevents upward movement of the tape reel 2 beyond the clearance. In the unlocked posture, the restriction member 32 moves and evacuates upward in the hub space 14 surrounded by the reel hub 12 as shown in FIG. 3, the restriction is released, and upward movement of the tape reel 2 is thereby allowed.

As shown in FIG. 2, the pair of left and right lock pieces 27, 27 are placed symmetrically with a tilt with respect to a symmetrical axis that is a central axis extending in to-and-fro direction through a center of rotation of the tape reel 2. In the locked posture, centers of the left and right restriction member 32 face the upper end surface of the reel hub 12 on a straight line that extends through the center of rotation of the tape reel 2 and that is orthogonal to the symmetrical axis. With the restriction members 32 restricting movements in opposed positions on periphery of the reel hub 12, the tape reel 2 can be stopped in equal positions and the upper and lower flanges 10, 11 can be prevented from being tilted greatly in a particular direction.

The floating-lock structure performs unlocking by making use of a loading operation on occasion when the main body case 1 is loaded into the tape drive. For that purpose, the entry grooves 37 that allow relative entry of unlock members 36 of the tape drive are formed at left and right on an outer surface of an upper wall of the upper case 1a so as to have recessed sections from a front edge to middle of the case, and operation openings 38 for exposing the releasers 31 in the entry grooves 37 are provided at rear end corners of the entry grooves 37 (see FIG. 5). When the main body case 1 is inserted and loaded into the tape drive, in actual use, the entry grooves 37 are engaged with and guided by the unlock members 36 fixed to loading part of the tape drive. If the main body case 1 is loaded in a wrong loading posture, an initial loading end of the main body case 1 comes into contact with the unlock members 36 so that the main body case 1 cannot be inserted further. The loading posture of the main body case 1 relative to the tape drive is restricted so as to be made adequate by the engagement between the unlock members 36 and the entry grooves 37.

Figure 7:
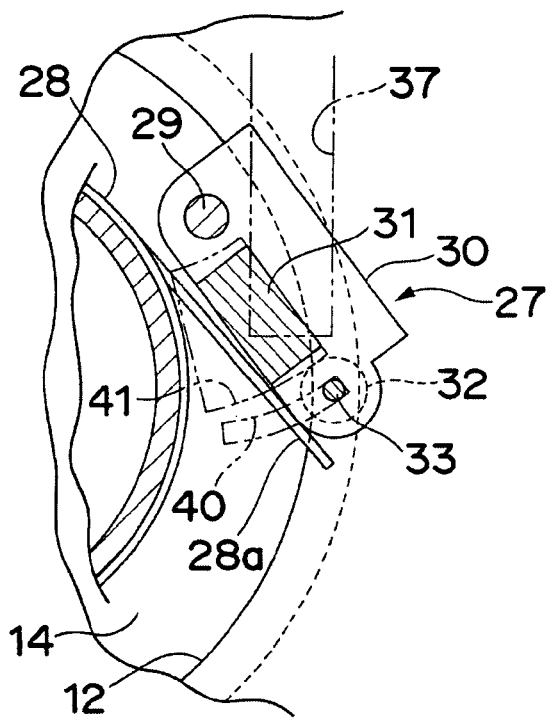
FIG. 7 is a cross-sectional plan view showing a positional relation with regard to the lock piece in locked status.

When the lock piece 27 is in the locked posture, part of the releaser 31 is exposed from the operation opening 38 into the entry groove 37 as shown in FIG. 7. Loading the main body case 1 in this status into the tape drive effects engagement of the entry grooves 37 with the unlock members 36 and relative movement between both the elements 36 and 37. When the releasers 31 come into contact with and are pressed by the unlock members 36, subsequently, the releasers 31 are pushed out of the entry grooves 37 against the biasing forces of the lock spring 28.

Figure 8:
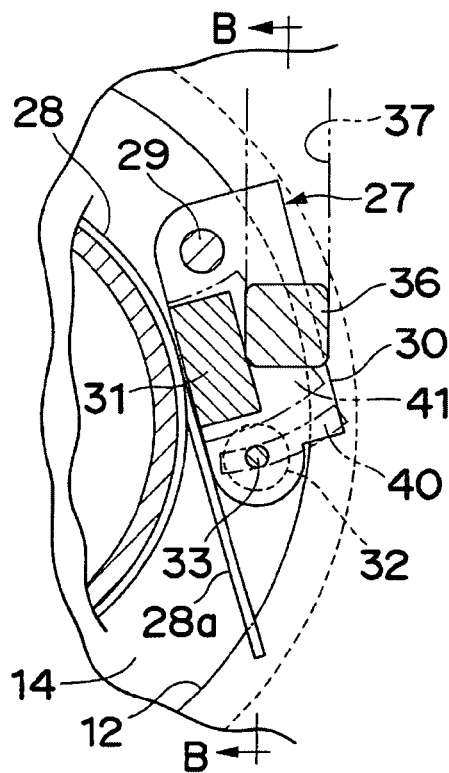
FIG. 8 is a cross-sectional plan view showing a positional relation with regard to the lock piece in unlocked status.

As a result, the lock pieces 27 are switched into the unlocked posture, as shown in FIG. 8. At this time, the restriction members 32 are positioned right above the hub space 14.

When the tape reel 2 is then driven and rotated in a position pushed up by a drive shaft D, therefore, the restriction members 32 are housed in the hub space 14 as shown in FIG. 3 and do not interfere with the rotation of the tape reel 2. On circumference of the upper surface of the drive shaft D, gear teeth 20 that mesh with the gear teeth 16 are formed.

The swing protrusion 33 provided on the swing arm 30 is guided by a guide groove 40 shaped like a partial arc and formed as a recess on the inner surface of the upper case 1a (see FIGS. 2 and 7). Adjacent to the guide grooves 40, recesses 41 that allow swing movement of the releasers 31 are formed on the inner surface of the upper case 1a. In such a configuration in which one end of the swing arm 30 is pivoted on the spindle 29 and in which movement of the swing protrusion 33 is guided by the guide groove 40, the swing motion of the lock piece 27 can be made smoother and the switching between the locked posture and the unlocked posture can be made more reliable, in comparison with a configuration in which the lock piece 27 is supported only by the spindle 29.

The tape cartridge configured as described above is capable of reliably restricting upward movement of the tape reel 2 with the simplified floating-lock structure and, upon reception of a drop impact, is capable of reliably preventing contact of the upper flange 10 with the upper case 1a and deformation or damage of upper tape edges of the recording tape 3 that might be caused by the upper flange 10. Besides, the production cost for the tape cartridge can be made all the lower because the floating-lock structure can be simplified with a number of component members thereof reduced significantly. Furthermore, the floating-lock structure can be unlocked with use of the loading operation with respect to the tape drive and thus cannot be unlocked in nonuse status, and the tape reel 2 in the nonuse status can be locked and held reliably at all times by the floating-lock structure so that damages to tape edges of the recording tape 3 can reliably be prevented.

Figure 9:
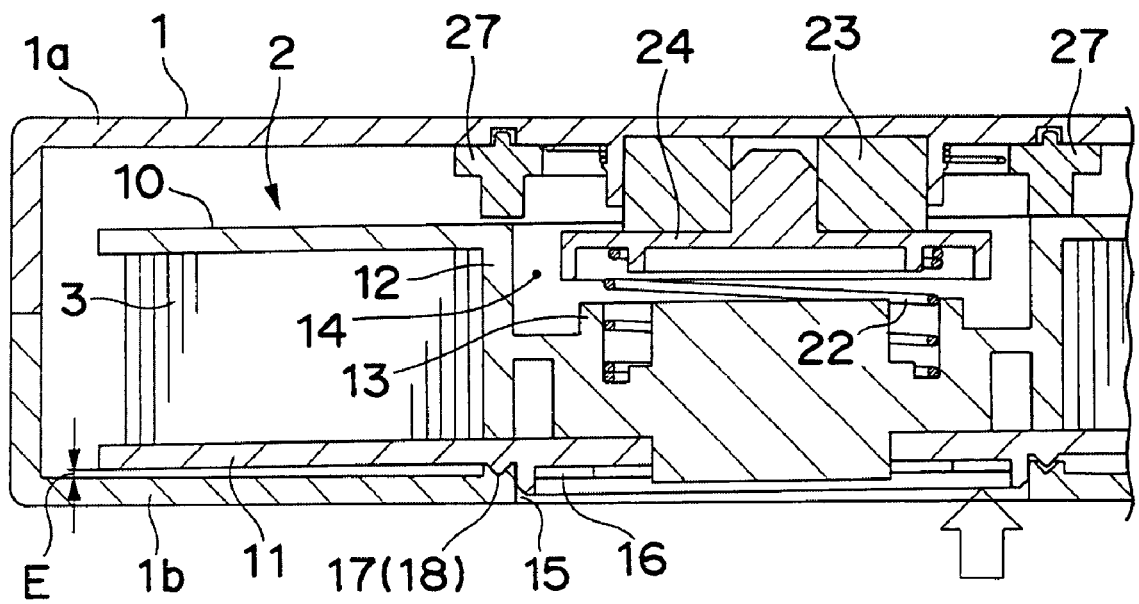
FIG. 9 is a vertical section showing a tilt restricting function of the lock piece.

In the nonuse status, as shown in FIG. 9, the lower surface of the lower flange 11 is exposed from the drive shaft entry hole 15 to outside of the case, and a whole body of the tape reel 2 can be tilted in the main body case 1 by contact of other object with the lower flange 11, drop impact, or the like that may be caused by mistake in handling of the tape cartridge. On such an occasion, the peripheral edge of the lower flange 11 on tilted end side tends to come into contact with the inner surface of the lower case 1b, while the upper surface of the tape reel 2 has been stopped and received by one of the restriction members 32.

Nevertheless, by the adequate clearance ensured between the lower flange 11 and the inner bottom surface of the lower case 1b with the positioning rib 17 properly engaged with and supported by the positioning groove 18 as described above, contact of the lower flange 11 with the lower case 1b can reliably be prevented with a clearance E (see FIG. 9) ensured between the peripheral edge of the lower flange 11 on tilted end side and the lower case 1b. Thus, deformation or damage of lower tape edges of the recording tape 3 by the lower flange 11 can reliably be prevented, even if the whole body of the tape reel 2 is tilted.

Figure 10:
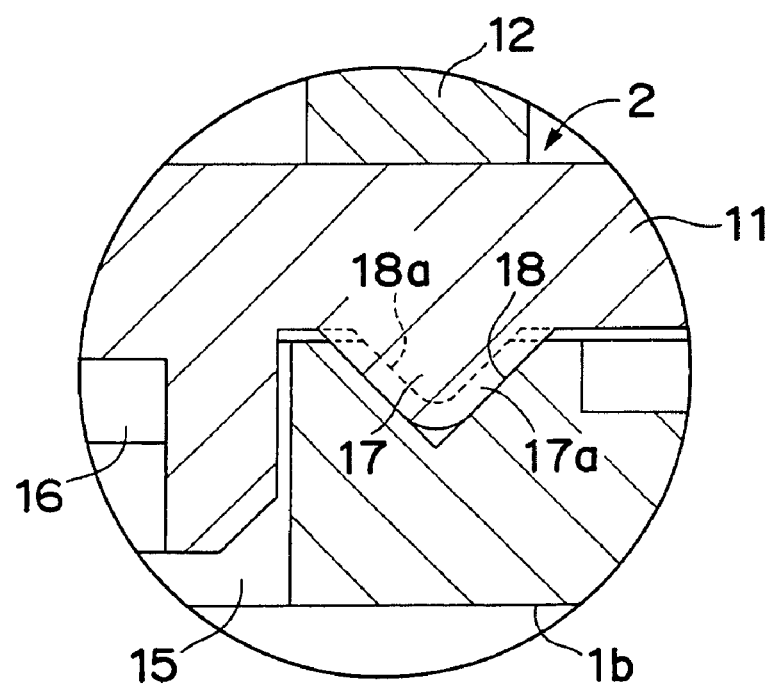
FIG. 10 is a section showing another embodiment of a structure for supporting a tape reel.

FIG. 10 shows another embodiment of a structure for supporting the tape reel 2. In the embodiment, gear teeth 17a and 18a that mesh with each other and that have sections shaped like letter V are formed on engagement surfaces of a positioning rib 17 and a positioning groove 18, and rotation of the tape reel 2 in nonuse status can be restricted more reliably by the mesh between both the gear teeth 17a and 18a. Other features are the same as those of the preceding embodiment, therefore, the same members are designated by the same reference numerals and description thereof will be omitted.

Instead of the above embodiments in which each lock piece 27 is separately unlocked by the two unlock members 36, the left and right lock pieces 27 may simultaneously be unlocked by one unlock member 36. Instead of the above embodiments in which the lock pieces 27 are shifted between the locked posture and the unlocked posture by being swung and reciprocated, for instance, the lock pieces 27 may be shifted between the locked posture and the unlocked posture by being slid back and forth along the upper wall of the upper case 1a without being swung and reciprocated.

Though at least one lock piece 27 is required, two or more lock pieces 27 can be provided as necessary. The releaser 31 may be provided anywhere in the entry groove 37, and is not limited to that which is provided at the end part of the entry groove 37 as described in the is embodiments. The floating-lock structure of the invention may be used with a rotation lock structure.

Malfunction or failure of equipment in the tape drive may occur on condition that the tape cartridge configured as describe is loaded in a wrong loading posture into the tape drive, on condition that the floating-lock structure has not fully been unlocked because of insufficient loading insertion of the tape cartridge, or the like. For instance, it is made impossible to drive and rotate the tape reel 2 by the drive shaft D or to properly draw out the leader block 4. Hereinbelow will be described still another embodiment in which the tape drive is provided with an operation checking device for checking whether a loading posture of the tape cartridge is proper or not and checking to see that the floating-lock structure has fully been unlocked prior to activation of the equipment in the tape drive in order to prevent such failure or malfunction of the equipment.

Among improper loading postures of the tape cartridge are a posture in which the main body case 1 is loaded front side back, a posture in which the main body case 1 is loaded upside down, a posture in which the tape cartridge is loaded in a loading part 48 with one side of the main body case 1 being initial loading end, and the like, though the main body case 1 should be loaded with front end openings of the entry grooves 37 being the initial loading end.

Figure 12:
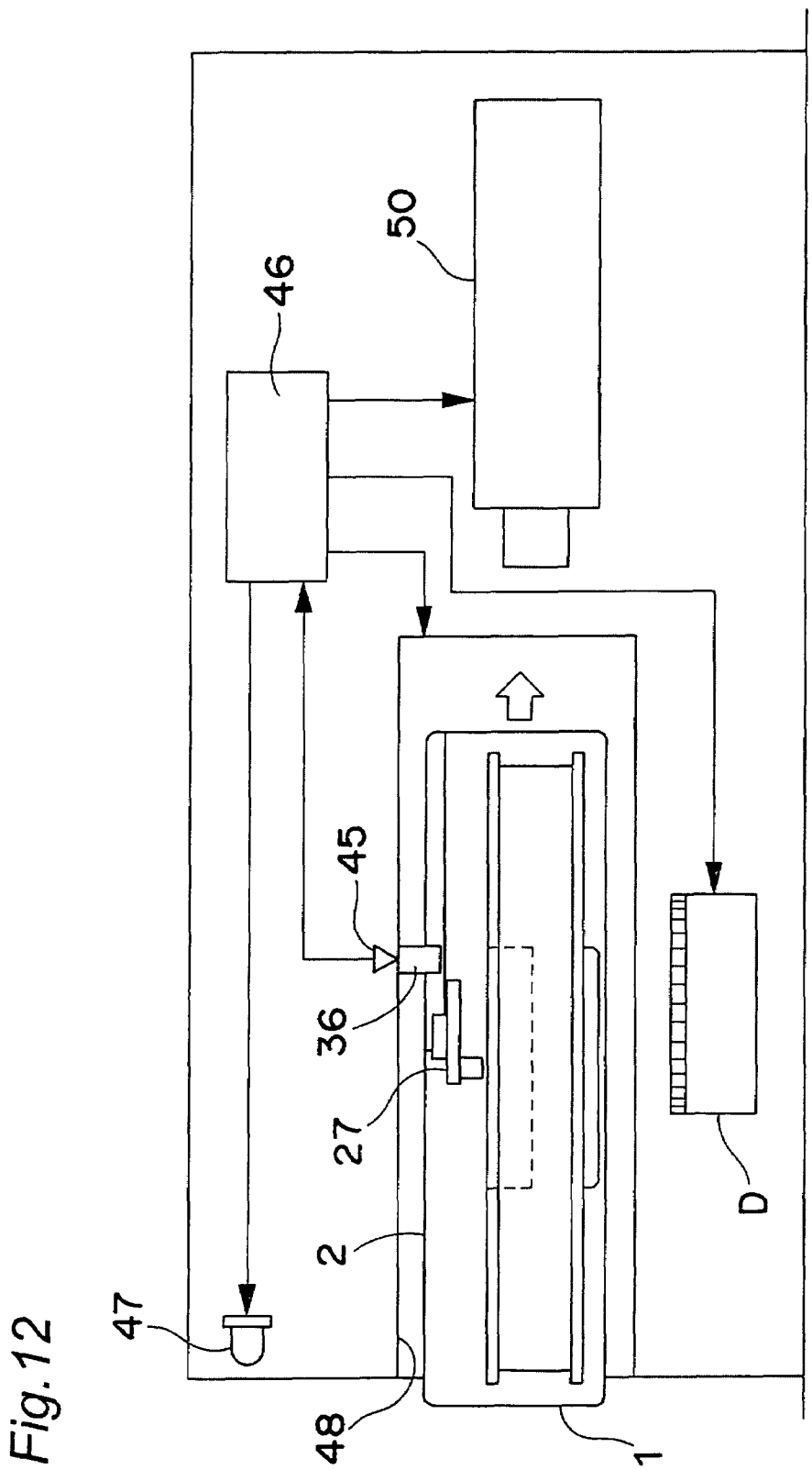
FIG. 12 is a schematic illustration of an operation checking mechanism in a tape drive.

In FIG. 12, the operation checking device comprises a sensor 45 for detecting whether a loading posture of the tape cartridge is proper or not and detecting that the floating-lock structure has properly been unlocked, a control circuit 46 for controlling operation of equipment in the tape drive in accordance with an output signal from the sensor 45, an alarm display element 47, and the like.

A commercial sensor such as strain gauge is used as the sensor 45, which is attached to the unlock member 36 provided on the upper wall of the loading part 48 of the tape drive and detects an external force acting on the unlock member 36. The control circuit 46 compares a signal outputted from the sensor 45 with a predetermined reference signal and determines whether a loading posture of the tape cartridge is proper or not and that the floating-lock structure has properly been unlocked. The alarm display element 47 comprises one or a plurality of LEDs and emits light for display on condition that the loading posture of the tape cartridge is improper, on condition that the floating-lock structure has not properly been unlocked, and the like. For instance, existence of an abnormal condition is displayed by blinking of one LED. The alarm display element 47 comprising the plurality of LEDs makes it possible to identify content of abnormality in accordance with colors of emitted light, blinking patterns and the like in the plurality of LEDs.

When the main body case 1 is loaded in the proper posture into the loading part 48, the unlock members 36 and the entry grooves 37 merely undergo relative movement and large external forces do not act on the unlock members 36. In a state in which the unlock members 36 have fully unlocked the lock pieces 27 against the biasing forces of the lock spring 28, external forces corresponding to spring elasticity of the lock spring 28 having undergone bending deformation act on the unlock members 36. On condition that the unlock members 36 have insufficiently unlocked the lock pieces 27, a quantity of bending of the lock spring 28 is smaller than in the fully unlocked state and external forces acting on the unlock members 36 are all the smaller. On condition that the main body case 1 is forcibly loaded in an improper posture into the loading part 48, external forces greater than the spring elasticity of the lock spring 28 act on the unlock members 36.

Figure 11:
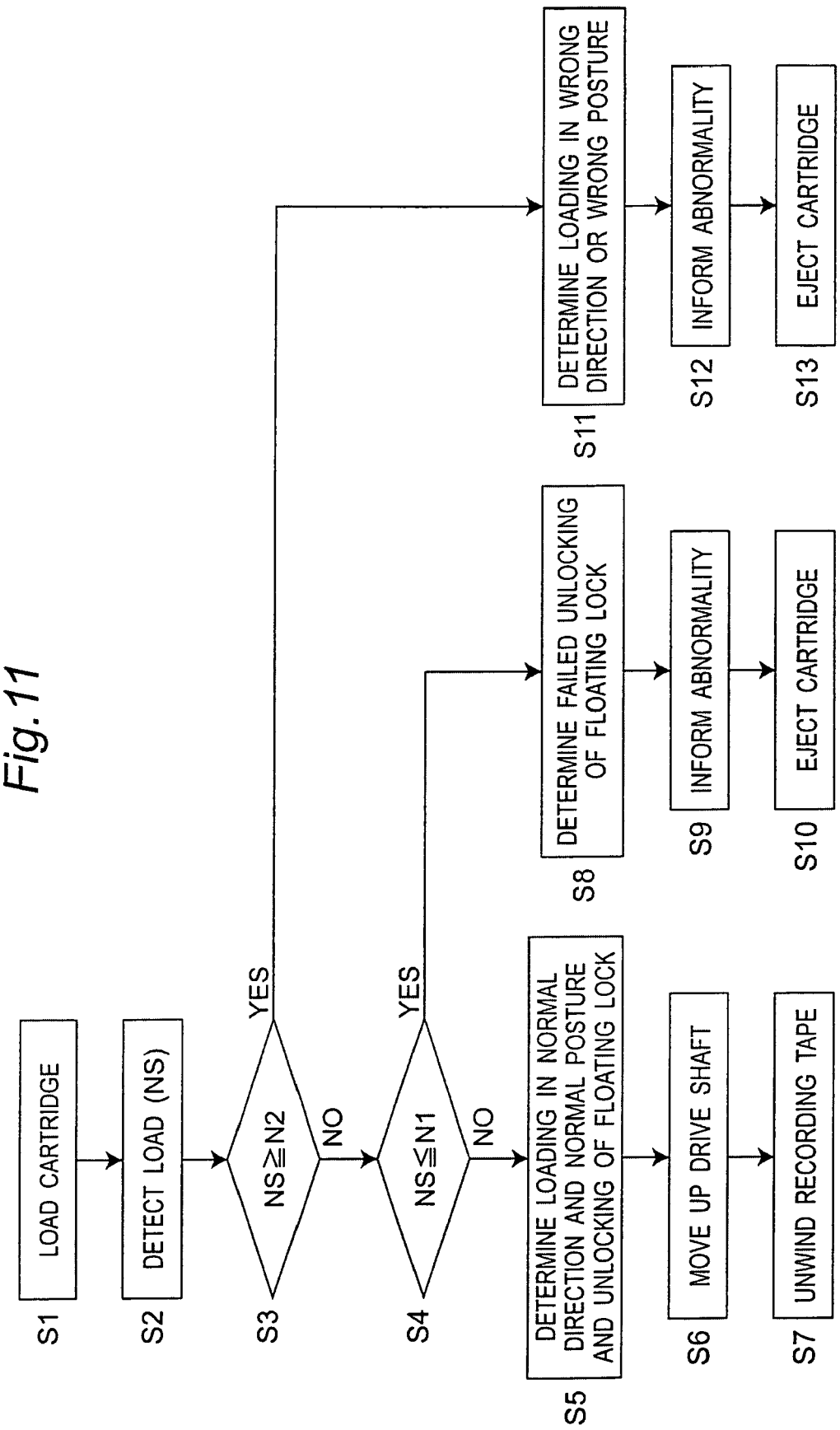
FIG. 11 is a flow chart showing a processing procedure on occasion of defective loading of a main body case.

The control circuit 46 determines the loading status by making use of the variation, described above, in the external forces acting on the unlock members 36, and forcibly ejects the tape cartridge that is in abnormal loading status. In a flow chart shown in FIG. 11, specifically, the main body case 1 is loaded into the loading part 48 in a first step S1, the external force acting on the unlock member 36 is detected by the sensor 45 (second step S2), and a result of the detection is outputted to the control circuit 46. Then a value of the external force detected by the sensor 45 is stored as NS. Into the control circuit 46 have been inputted in advance a lower limit value N1 and an upper limit value N2 of the proper external force.

In a third step S3, a comparator circuit compares the external force value NS with the upper limit value N2 of the external force and determines whether an inequality (NS>=N2) is satisfied or not. If the inequality (NS>=N2) is satisfied, then processings are executed pursuant to a system branching out from the third step S3. Specifically, it is determined that the main body case 1 has been loaded in the improper posture into the loading part 48 (step S11), the alarm display element 47 emits light for display (step S12), a loading device of the tape drive is activated so as to forcibly eject the tape cartridge (step S13). If the inequality (NS>=N2) is not satisfied in the third step S3, then the flow goes to a fourth step S4.

In the fourth step S3, the comparator circuit compares the external force value NS with the lower limit value N1 of the external force and determines whether an inequality (NS<=N1) is satisfied or not. If the inequality (NS<=N1) is satisfied, then processings are executed pursuant to a system branching out from the fourth step S4. Specifically, it is determined either that the unlock members 36 have insufficiently unlocked the lock pieces 27 or that no external forces act on the unlock members 36 (step S8), the alarm display element 47 emits light for display (step S9), and the loading device of the tape drive is activated so as to forcibly eject the tape cartridge (step S10). If the inequality (NS<=N1) is not satisfied in the fourth step S4, then the flow goes to a fifth step.

Specifically, it is determined that the main body case 1 has been loaded in the proper posture into the loading part 48 (fifth step S5), the drive shaft D of the tape drive device is moved upward and connected to the tape reel 2 (sixth step S6), and an operating command is issued that the leader block 4 be drawn out of the case and be passed to a take-up reel 50 and that the recording tape be unwound, or the like (seventh step S7). Above processings ensure that information signals are read from and written into the recording tape 3 only in a state in which the tape cartridge has been loaded in the proper status into the loading part 48.

The sensor 45 that forms the operation checking device does not have to comprise a sensor for detecting an external force acting on the unlock member 36. Instead of that, for instance, the unlock members 36 are supported so as to be capable of reciprocating and are biased for standby by equalizer springs that have the same characteristics of spring as the lock spring 28 has and that are capable of exerting a spring tension as large as that of the lock spring 28. When external forces exceeding the upper limit value N2 act on the unlock members 36, positions of the unlock members 36 are shifted against biasing forces of the equalizer springs. The shift in position of the unlock members 36 is detected by a first sensor. In the loading part 48 is also provided a second sensor for detecting whether the initial loading end of the main body case 1 has properly been loaded or not with respect to the loading part 48.

The operation checking device having such a configuration is capable of determining whether the tape cartridge has properly been loaded or not into the loading part 48, on basis of results of detection by the first sensor and the second sensor. If the first sensor has detected the shift in positions of the unlock members 36, it can be found that the main body case 1 has forcibly been loaded in the improper loading posture into the loading part 48. With the second sensor detecting that the initial loading end of the main body case 1 has not been loaded to a proper position, it can be found that the floating-lock structure has not fully been unlocked. Various sensors such as a microswitch, proximity switch, and optical sensor are used for the first sensor and the second sensor.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of Japanese patent application No. 2006-252168 filed on Sep. 19, 2006, including specification, drawings, and claims, is incorporated herein by reference in its entirety.

What is claimed is:

1. A single-reel type tape cartridge comprising:
   a main body case including an upper case and a lower case;
   a tape reel which is housed in the main body case and on which a recording tape is wound; and
   a floating-lock structure, which is provided between an upper surface of the tape reel and the upper case, for restricting upward movement of the tape reel in nonuse status, wherein
   an outer surface of the upper case has an entry groove which has a recessed section and which is to be engaged with an unlock member provided in a tape drive so as to guide relative entry of the unlock member, and
   a loading posture of the main body case relative to the tape drive is restricted by engagement between the unlock member and the entry groove and by guidance of the relative entry thereof in a process in which the main body case is loaded into the tape drive, and the floating-lock structure is unlocked by action of the unlock member on the floating-lock structure with the unlock member being engaged with the entry groove.

2. A single-reel type tape cartridge as defined in claim 1, wherein the floating-lock structure comprises:
  a lock piece which is placed on an inner surface of the upper case and which is supported by the upper case so as to be capable of reciprocating between a locked posture and an unlocked posture; and
  a lock spring for moving and biasing the lock piece toward the locked posture, and wherein
the lock piece comprises:
  a restriction member which, in the locked posture, restricts upward movement of the tape reel by being brought into contact with the tape reel and which, in the unlocked posture, releases the contact with the tape reel and releases the restriction; and
  a releaser that moves the lock piece from the locked posture to the unlocked posture against a biasing force of the lock spring by being pressed by the unlock member of the tape drive, and wherein
an opening penetrating the upper case is formed in part of the entry groove so as to expose the releaser in the entry groove, and
part of the releaser exposed in the entry groove is pressed by the unlock member so that the lock piece is shifted to the unlocked posture, in a state in which the main body case has been loaded in the tape drive.

3. A single-reel type tape cartridge as defined in claim 2, wherein
  a pair of the floating-lock structures are placed between the upper surface of the tape reel and the upper case,
  the entry grooves for the unlock members are placed symmetrically on the outer surface of the upper case so as to correspond to the pair of the floating-lock structures, and
  the releasers of the floating-lock structures are respectively exposed in the entry grooves from the openings provided in the entry grooves in a state in which the main body case is not loaded in the tape drive.

4. A single-reel type tape cartridge as defined in claim 3, wherein a pair of the lock pieces in the pair of the floating-lock structures are moved and biased toward the locked posture by one torsion coil spring placed as the lock spring on the inner surface of the upper case.

5. A single-reel type tape cartridge as defined in claim 2, wherein
  the lock piece comprises:
    a swing arm which is pivoted through a spindle on the upper case so as to be capable of performing reciprocating swinging and on which releaser is fixed to an upper surface thereof and the restriction member is fixed to a lower surface thereof; and
    a swing protrusion which is fixed to swingable distal end side on the upper surface of the swing arm and which guides the reciprocating swinging of the swing arm by being moved and guided along a guide groove formed on the upper case, and wherein
  the lock piece is reciprocated between the locked posture and the unlocked posture by the reciprocating swinging of the swing arm.

6. A single-reel type tape cartridge as defined in claim 2, wherein a clearance for preventing contact between a peripheral edge of a lower flange of the tape reel and an inner surface of the lower case which might be caused by a tilt of the tape reel in the main body case is provided between the peripheral edge of the lower flange and the inner surface of the lower case in a state in which upward movement of the tape reel is restricted by the floating-lock structure.

7. A tape drive for a single-reel type tape cartridge in which a tape reel, for winding with a recording tape, is housed in a main body case including an upper case and a lower case, the tape drive comprising:
  an unlock member provided in loading part of the tape drive, for performing an unlocking operation by engaging with an entry groove formed on an outer surface of the upper case and by acting on a floating-lock structure provided between an upper surface of the tape reel and the upper case in the tape cartridge, the floating-lock structure having a function of restricting upward movement of the tape reel in nonuse status;
  a sensor for detecting whether a loading posture of the tape cartridge relative to the loading part is proper or not and detecting that the floating-lock structure has properly been unlocked; and
  a control circuit for controlling operation of equipment in the tape drive in accordance with an output signal from the sensor.

8. A tape drive as defined in claim 7, wherein
the sensor is a sensor for detecting an external force acting on the unlock member, and
the control circuit determines that whether a loading posture of the tape cartridge is proper or not and that the floating-lock structure has properly been unlocked, by comparing a detection signal outputted from the sensor with a predetermined reference signal.

* * * * *